United States Patent [19]

Gross

[11] 4,167,680

[45] Sep. 11, 1979

[54] EMERGENCY STANDBY SYSTEM FOR AUTOMATIC TRANSFER FROM UTILITY POWER TO A BATTERY POWERED SYSTEM

[75] Inventor: Ronald D. Gross, Wyoming, N.Y.

[73] Assignee: Chloride Electro Networks, Tampa, Fla.

[21] Appl. No.: 796,712

[22] Filed: May 13, 1977

[51] Int. Cl.[2] .............................................. H02J 9/00
[52] U.S. Cl. ...................................... 307/66; 340/333
[58] Field of Search ....................... 307/66, 64, 18, 23; 340/333

[56] References Cited

U.S. PATENT DOCUMENTS

| | | | |
|---|---|---|---|
| 3,818,272 | 6/1974 | Rich | 307/66 X |
| 3,925,772 | 12/1975 | Miller et al. | 307/66 X |

Primary Examiner—Gene Z. Rubinson
Assistant Examiner—Morris Ginsburg

[57] ABSTRACT

An emergency standby power system for automatic transfer from utility power to a battery powered inverter when a normal source of utility power is interrupted to a given load, and for automatic re-transfer to utility power when it is restored. The inverter includes SCR circuitry whereby commutation failure during start-up and shut-down is prevented by applying power to the inverter prior to the application of the gate drive during start-up, and removing power from the inverter prior to the removal of the gate drive during shut-down. Further, the control circuitry ensures that the first SCR gated on will operate for a complete one-half cycle, thereby fully charging the commutating capacitor for reliable commutation off of the first SCR before turning on the second SCR. The control circuitry also permits the inverter to start up even if it is presented with a short circuit and operate without damage.

7 Claims, 2 Drawing Figures

EMERGENCY STANDBY SYSTEM FOR AUTOMATIC TRANSFER FROM UTILITY POWER TO A BATTERY POWERED SYSTEM

BACKGROUND OF THE INVENTION

1. Field of the Invention

The invention relates to an emergency standby power system for automatic transfer from utility power to a battery powered inverter when the normal source of utility power is interrupted to a given load.

2. Description of the Prior Art

The prior art generally discloses systems wherein a battery driven inverter is automatically switched into a circuit when the normal line voltage fails. The Rich U.S. Pat. No. 3,818,272 relates to a standby power system employing SCR inverters in which the load at the output of the inverter is automatically removed in the event a load short circuit occurs, and in which high surge current requirements on the inverter by the load are limited to avoid commutation failure in the SCR inverter. The surge and short circuit detection circuit automatically connect the load back to the inverter at a predetermined time, once having made an initial connection. Miller et al U.S. Pat. No. 3,925,772 relates to a standby power supply, in which a battery sensing circuit is included for producing a control signal when the charge of the battery falls below some predetermined level to replenish the D.C. source.

Circuits to provide proper commutation and operation generally are also known. For example, Eastop U.S. Pat. No. 3,657,634 applies trigger pulses to the SCR's before voltage zero of the natural resonant frequency of the load to ensure adequate buildup of current in the SCR's. Kondo et al and Pelley et al U.S. Pat. Nos. 3,534,243 and 3,599,078 pre-charge the commutating capacitor to ensure proper commutation. Larsen U.S. Pat. No. 3,350,625 uses a time delay relay which delays conduction of the silicon controlled rectifiers and application of supply voltage to a trigger signal generating circuit for a predetermined time interval after closing the main circuit breaker or switch, to prevent erratic operation which might otherwise result from voltage transients produced during closing of the breaker or switch.

SUMMARY OF THE INVENTION

The system in accordance with the invention provides advantages over the prior art, particularly in that it guarantees that the inverter will start properly the first time operation is transferred to the standby system, and in that it enables the standby system to start into shorts and operate without damage. Commutation failure in the complementary commutated inverter during start-up and shut-down are prevented by ensuring that (1) power is always applied prior to the gate drive during start-up and removed first at shut down; (2) the first SCR gated on will operate for a complete one-half cycle, fully charging the commutating capacitor for reliable commutation off of the first SCR before turning on the second SCR; and (3) the SCR gate drive characteristics are as required to ensure reliable control of the device.

Battery voltage detection circuitry ensures positive shutdown preventing deep battery discharge or operation with inadequate gate drive, cycling of the inverter with battery open circuit recovery while maintaining the ability to completely utilize the full battery capacity either during an extended power outage or with repeated interruption and resumption of power without an interim period of re-charging to bring the battery above the upper detector threshold.

Reverse voltage protection is provided at the low power logic level, eliminating the attendant reduction in efficiency or interruption of extremely high currents encountered in conventional means of protection.

DETAILED DESCRIPTION OF THE INVENTION

Figure 1:
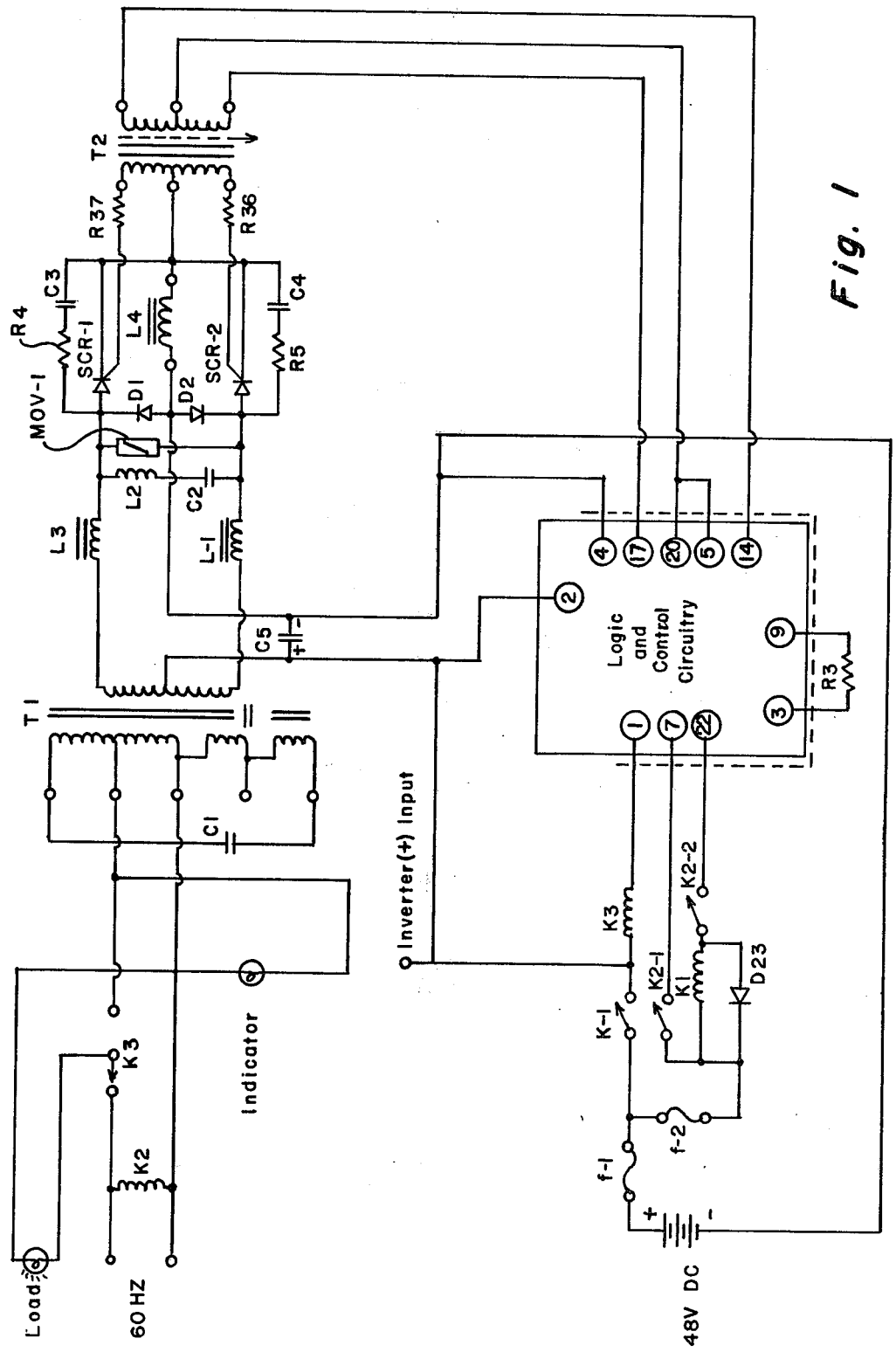
FIG. 1 is a schematic diagram of the inverter circuit used in conjunction with the system of the invention.

The emergency standby power system comprises a D.C. to 60 HZ inverter circuit as shown in FIG. 1. Transfer from utility power to the inverter is initiated upon interruption of the normal source, and automatic retransfer is effected upon restoration of normal power.

Power inversion is provided by a parallel commutated inverter comprising SCR-1 and SCR-2, commutating reactor L4, feedback diodes D1 and D2, neutralizing and regulating transformer T1, linear reactors L1 and L3, commutating capacitor C2, resonant capacitor C1, dI/dt reactor L2 transient voltage suppressor MOV-1, DV/Dt networks R4/C3 and R5/C4, and drive transformer T2. The logic and control circuitry is connected to the inverter as shown.

Gate pulses are alternately applied to the gates of SCR-1 and SCR-2 through transformer T2. When SCR-1 is turned on, battery B will be connected across L4, SCR-1, L3 and the top half of transformer T1. A voltage is thereby induced across the ends of the primary winding of transformer T1, charging commutating capacitor C2 to twice battery voltage. At the termination of the first half cycle, SCR-2 is triggered on connecting the capacitor across the anode and cathode of SCR-1, reverse biasing SCR-1 for a sufficient period to ensure its turn off. Peak current during the time in which SCR-1 and SCR-2 are both on is limited by commutating reactor L4. Diodes D1 and D2 function to return reactive power to the battery.

Wave shaping, voltage regulation and current limiting are provided by the ferro-resonant assembly consisting of transformer T1, reactors L1 and L3, and capacitor C1. A series circuit is established consisting of reactors L1 and L3 and the parallel combination of saturable core transformer T1 and its output capacitor. The voltage dependent transformer impedance in parallel with its output capacitor will appear either inductive or capacitive depending upon its excitation, and its net impedance in conjunction with the series linear reactor will then either produce an increase or decrease in voltage to maintain essentially constant output voltage. An additional transformer winding so situated on the core structure as to be rich in harmonic voltage may be interconnected with the output winding to reduce its harmonic content and provide a sine wave output. The short circuit current is limited by the reactance of series linear reactors L1 and L3.

Figure 2:
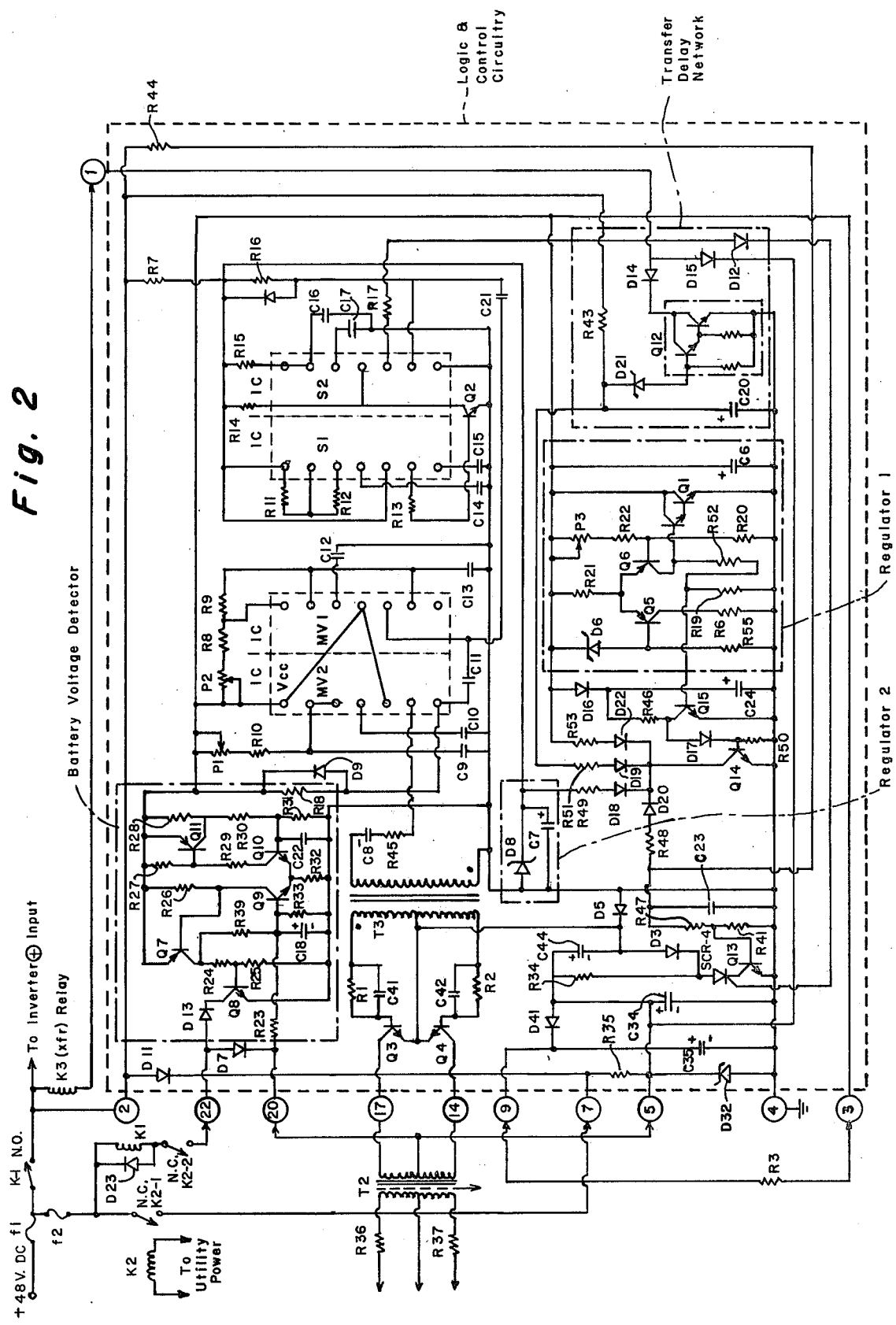
FIG. 2 is a schematic diagram of the logic and control circuitry in accordance with the system of the invention.

The logic and control circuitry for the system in accordance with the invention is shown in detail in FIG. 2. The various contacts are shown in their normal position when the normal utility power is supplying the load. Upon interruption of the normal utility power, the normally open contacts of relay K2 will close, simultaneously connecting the battery B to the logic board terminal 7 through contact K2-1 and enabling relay K1 to close, provided the battery voltage is found acceptable as explained hereinafter. The battery supply then passes through the filter/transient/reverse voltage protection network comprised of resistor R35, diode D32, and capacitor C34, connected at terminal 7. The gate drive amplifier is supplied this power with no further conditioning, while the logic circuitry is supplied a lesser voltage, such as 12 volts, through Regulators 1 or 2.

Free running multivibrator MV1 produces output pulses of 15 MS duration at a repetition rate of 60 p.p.s. These pulses in turn trigger the one shot multivibrator MV2 to provide a 60 HZ square wave which is coupled to the drive amplifier by resistor R45, capacitor C8, and transformer T3. Multivibrators MV1 and MV2 comprise conventional integrated circuit chips (IC) connected as gate pulse sources which function as a square wave generator, and it should be apparent to those in the art that other types of square wave generators can also be employed. The drive amplifier comprising transistors Q3 and Q4 remains inactive until the emitters of transistors Q3 and Q4 are returned to ground by the application of forward bias to transistor Q13 and a trigger pulse to SCR-4.

In the following description, the citation of specific time periods and voltages are typical, but the invention is not limited to these specific time periods. They are cited for exemplary purposes only.

With the closure of contact K2-1, the voltage supplied by Regulator 1 will rise to 12 volts at the rate of 0.6 V/ms. The battery detector senses the battery voltage by comparing it with a reference voltage, through the comparator comprising transistors Q9 and Q10. The voltage on the battery sensing side of the comparator at the base of transistor Q9 will rise at 0.2 V/ms. Since the voltage at the base of transistor Q10 rises faster than that at the base of transistor Q9, transistor Q10 will conduct, turning on transistor Q11 to establish the base of transistor Q10 at the higher of two reference voltages. Simultaneously, the voltage Vcc supplied to the IC chips comprising MV1 and MV2 rises at the 0.6 V/ms. rate, the output of the multivibrator MV2 being high during the rise to 12 volts because the time out network consisting of R8, R9, P2, C13 further delays the input to its threshold.

When sufficient time has elapsed, the input to the threshold will reach two thirds of Vcc and re-set the flipflop MV1, driving the output low. The negative going pulse in turn triggers multivibrator MV2 and causes its output to go high.

This 12 V pulse is capacitor coupled to transformer T3 through resistor R45 and capacitor C8. Since the transformer will only support 12 volts for about 5 ms without saturation, the current will rapidly rise after this period attempting to change the charge on capacitor C8. Normally after one-half cycle, the multivibrator MV2 output would go low and discharge capacitor C8 through the transformer in such a direction as to unsaturate the core, and after a number of cycles would bias capacitor C8 to 6.0 volts and alternately drive transformer T3 plus and minus 6 V for 8.33 ms in each direction without saturation.

This action is inhibited by allowing the charging current to pull the 12 volt supply at regulator 1 down to approximately 6.0 V. Since the V threshold is now more than two-thirds, Vcc, the output at multivibrator MV1 will go low again, triggering multivibrator MV2 high and again attempt to drive saturated transformer T3. Since it cannot do this, capacitor C8 is further charged and current begins to fall, permitting the 12 volt supply to rise. 26 ms later multivibrator MV2 receives another trigger pulse, further charging capacitor C8, and after a slightly extended time due to the still rising 12 volt supply, will time out and discharge capacitor C8 through transformer T3, driving the transformer negative. Repeated changes in state of multivibrator MV2 will cause capacitor C8 to assume its normal bias and produce a symmetrical drive to transformer T3 in approximately 300 ms.

During the time that the 12 volt supply is recovering, the voltage presented to the base of transistor Q9 will rise above the reduced voltage presented to the base of transistor Q10. Transistor Q10 will then cease conducting and turn off transistor Q11, establishing the base of transistor Q10 at the lower of two reference voltages. Transistors Q9, Q7 and Q8 will turn on and bring the collector of transistor Q8 to ground, operating relay K1.

With the operation of relay K1, the battery is applied to the inverter proper and terminal 2 of the logic circuitry. Regulator 2 will be activated and supply 12 volts to sequencing or timing circuits S1 and S2. Circuit S1 comprises an IC connected as a free running multivibrator, whose output is normally high for 150 ms and low for 20 ms, which clamps the reset terminal of circuit S2 low during its high state through transistor Q2. Circuit S2 similarly comprises an IC connected as a free running multivibrator. However, it should be apparent to those in the art that other equivalent circuits may be utilized. The first high period is extended to approximately 300 ms while the +12 volt supply from regulator 1 is recovering. During the 20 ms in which circuit S1 is low, circuit S2 is enabled and will produce a positive going pulse of 1 ms duration coincident with the falling edge of the output of multivibrator MV1. This pulse is delivered to the gate of SCR-4 bringing the emitters of transistors Q3 and Q4 to ground. The square wave drive supplied to transistors Q3 and Q4, which function as a saturation amplifier, from multivibrator MV1 through transformer T3 will, at this time, be amplified and delivered to the gates of SCR-1 and SCR-2. The uncontrolled trigger pulse during power build-up produced by circuit S2 is prevented from latching SCR-4 by the time delay network comprising resistors R44, R41, R47 and capacitor C23 connected in the base circuit of transistor Q13.

These prerequisites for gate drive application ensure that (1) sufficient time has elapsed for the drive to have settled to the degree necessary for utilization, and (2) the first SCR driven on will be on for a complete half-cycle, fully charging commutating capacitor C2 such that reliable commutation of the first SCR will take place when the second one is triggered on.

Coincident with the circuit comprising the closure of contact K-1, a fixed time out is initiated through the transfer delay network comprising resistor R43, capacitor C20, diode D21, and transistor Q12. At the end of approximately 1 second, the collector of transistor Q12 will go to ground and operate the transfer relay. This delay permits unloaded operation utilizing the combined flux capabilities of inverter transformer T1 and linear reactors L1 and L3 while they are making the transition from partial to full B-H loop operation. Without this, a shorted load or essentially the same thing, such as a cold incandescent lamp bank load, would force all of the voltage to be applied to reactors L1 and L3 causing their saturation and subsequent commutation failure.

When the battery has been depleted to the point where the voltage presented to the base of transistor Q9 by voltage divider comprising resistors R23 and R33 is less than that at the base of transistor Q10, transistor Q9 will cause the cease conducting, turning off transistor Q7 and Q8. The collector of transistor Q8 goes high and will release contact K-1. With transistor Q10 now conducting, transistor Q11 will be turned on and modify the reference voltage from (12 R31/(R28+R30+R31)) to 12 R 31/(R30+R31). Before contact K-1 can be reactivated, the voltage presented to transistor Q9 must either equal this higher value, or a resumption of normal power with a subsequent interruption of same must occur to reset the logic and reinitiate the start-up sequence.

Cycling of the inverter, deep discharge of the battery, and operation with insufficient gate drive are thus prevented, while maintaining the capability of operation when battery capacity exists of either continuous operation during an extended outage, or intermittent operation if repeated interruption and resumption of normal power should occur.

In the event that utility power returns prior to shutdown initiated by low battery voltage, relay contact K2-1 will open, removing the D.C. supply from terminal 7 and ground from contact K-1. To prevent commutation failure which could follow from removal of the gate signal before the inverter supply, an alternate path through diode D11 is provided to keep the logic circuitry active during the release time of contact K-1.

Upon release of contact K-1, the inverter input capacitor C5 voltage will decay and, when insufficient voltage is supplied to sustain the main 12 volt supply from regulator 1, transistor Q6 will turn off removing drive from transistor Q15 and turn transistor Q14 on to (1) rapidly discharge capacitor C23 through resistor R48 and diode D20, turning transistor Q13 off and commutating SCR-4 off, (2) discharge capacitor C20 through resistor R51 and diode D19 to release the transfer relay, (3) shut down sequencing circuits S1 and S2 through resistor R43 and diode D18 and (4) load down the 12 volt supply from regulator 1 through resistor R53 and diode D22, preventing transistor Q6 from turning on again when the input increases due to the reduced IR drop across resistor R3 because of turning off SCR-4.

Turning on bias for transistor Q14 is maintained for the required duration by capacitor C24, which is charged by isolation diode D16. With this having taken place, the inverter is ready for another orderly startup if required.

Reverse voltage protection is provided by the circuit consisting of F2, R35 and D32. Diode D32 will conduct in the forward direction and limit the reverse voltage presented to the logic circuitry to one diode drop, until F2 opens and removes the supply. Since contact K-1 is not permitted to operate, reverse voltage does not appear at the input of the inverter.

The circuitry disclosed in FIGS. 1 and 2 comprise a preferred embodiment of the invention, but it should be evident to those in the art that other equivalent circuits can be substituted therefor without departing from the scope of the invention. Further, the operating voltages and relative time rates and values disclosed are intended as being for exemplary purposes, and are typical for an emergency power system for lighting purposes. Obviously the disclosed standby system can be used in conjunction with other types of loads.

I claim:

1. A standby power supply system for connecting an inverter to supply a given load upon interruption of normal A.C. utility service, comprising:
   an SCR inverter having first and second silicon controlled rectifiers for deriving alternating current from a battery,
   logic control means to control the operation of the inverter, having:
       means connected to the inverter to cause the first SCR to be operative for a full one-half cycle before commutating the second SCR on,
       means connected to the inverter to cause the battery to be connected thereto prior to the application of gate drives to the gates of the first and second silicon controlled rectifiers when the inverter is initially connected to supply the load, and to disconnect the battery from the inverter prior to the removal of the gate drives from the gates of the first and second silicon controlled rectifiers when disconnecting the inverter from the load.

2. The standby power supply system as recited in claim 1 further comprising first time delay means to enable the gate drives to become sufficiently stable after initially connecting the inverter to supply the load before operation of the silicon controlled rectifiers.

3. The standby power supply system as recited in claim 2 wherein the inverter comprises transformer and linear reactor means,
   second delay means to provide a predetermined time delay before the inverter supplies the load during which time of unloaded operation the combined flux capabilities of the transformer and linear reactor are utilized while they are making the transition from partial to full B-H loop operation, such that an essentially shorted load does not force all of the battery voltage to be applied to the linear reactor means, whereby saturation and subsequent commutation failure is avoided.

4. The standby power supply system as recited in claim 3 further comprising:
   means to sense the battery voltage,
   means controlled by the battery sensing means to disconnect the battery from the inverter should the battery voltage fall below a first predetermined level, and to prevent reconnection of the battery to the inverter until the battery voltage can build-up to a second predetermined level, which is higher than said first predetermined level, to prevent deep discharge of the battery.

5. The standby power supply system as recited in claim 1 wherein the inverter comprises transformer and linear reactor means,
   first delay means to provide a predetermined time delay before the inverter supplies the load during which time of unloaded operation the combined flux capabilities of the transformer and linear reactor means are utilized while they are making the transition from partial to full B-H loop operation, such that an essentially shorted load does not force all of the battery voltage to be applied to the linear reactor means, whereby saturation and subsequent commutation failure is avoided.

6. The standby power supply system as recited in claim 5 further comprising:
   means to sense the battery voltage,
   means controlled by the battery sensing means to disconnect the battery from the inverter should the battery voltage fall below a first predetermined level, and to prevent reconnection of the battery to the inverter until the battery voltage can build-up to a second predetermined level, which is higher than said first predetermined level, to prevent deep discharge of the battery.

7. The standby power supply system as recited in claim 1 further comprising:
   means to sense the battery voltage,
   means controlled by the battery sensing means to disconnect the battery from the inverter should the battery voltage fall below a first predetermined level, and to prevent reconnection of the battery to the inverter until the battery voltage can build-up to a second predetermined level, which is higher than said first predetermined level, to prevent deep discharge of the battery.

* * * * *